Sept. 18, 1928.
N. R. INGLIS
STAND
Filed Feb. 24, 1928
1,684,446
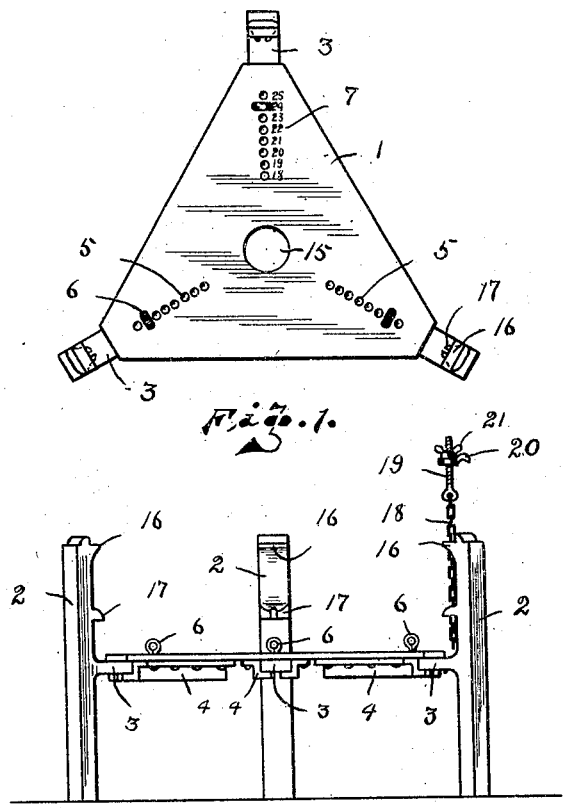
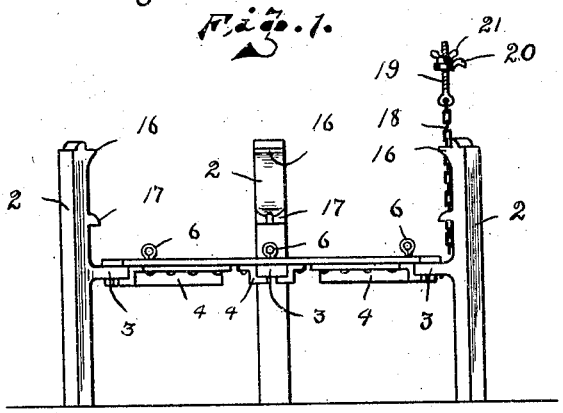
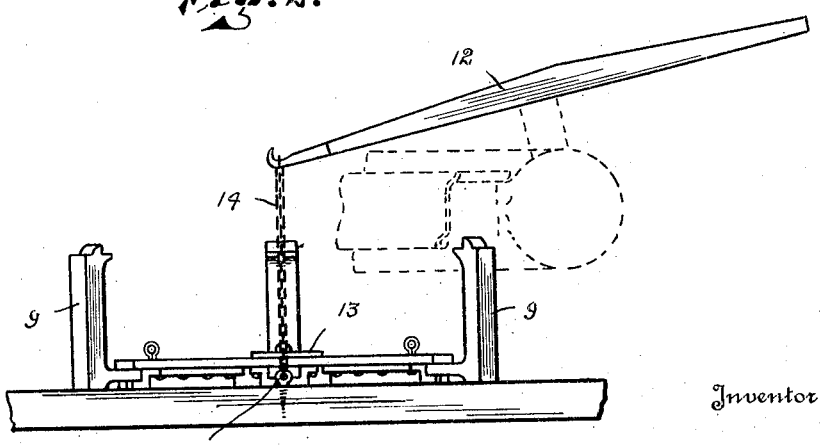
Inventor
N. R. Inglis.
By Geo. Stevens
Attorney Patented Sept. 18, 1928.

1,684,446

UNITED STATES PATENT OFFICE.

NEWTON R. INGLIS, OF DULUTH, MINNESOTA.

STAND.

Application filed February 24, 1928. Serial No. 256,797.

This invention relates to stands and has special reference to such a device particularly adapted for use in the handling of automobile tires and rims.

The principal object is to provide a convenient stand or support in the handling of large and heavy tires and rims in the mounting and demounting of same.

Other objects and advantages of the invention will appear in the further description thereof.

Referring now to the accompanying drawing, forming part of this application and wherein like reference characters indicate like parts:

Figure 1 is a top plan view of one of my improved stands;

Figure 2 is a side elevation of Figure 1, and

Figure 3 is an elevation of a modified form of stand illustrating a specific use of same.

The preferred form of such stand and the embodiment here illustrated is of the three legged type, and comprises the triangularly shaped body portion 1, with a leg 2 slidably mounted within each corner thereof, and for such slidable connection I provide each leg centrally of its back with a right angular extension 3 which is rectangular in cross section and slidably supported within two opposed Z-bars 4 one upon either side thereof forming a suitable channel for the extension 3, or if preferred this channel may be formed in any other desired manner.

On the top of the body 1 are formed series of holes indicated at 5 directly over the center line of each channel formed therebeneath for the extensions 3 of the legs, and in the extensions are one or more holes as desired for registration with the respective series, and any desired pin, such as a cotter or the like indicated at 6 may be used for dropping through these holes in the adjustment of the legs to and from the center of the body portion. I prefer to place certain designating numbers as indicated at 7 opposite the holes to indicate the diameter of the corresponding rim size to which the legs may be adjusted. The upper end of each leg has formed thereupon a barefaced tenon or notch for the reception of the edge of the rim when placed thereupon, and I have shown the body portion 1 as being substantially midway the ends of the legs so as to provide ample room in the event of a disc wheel being placed on top of the stand, so that the disc or hub thereof would not interfere by striking the body portion. In use, the stand is set upright as shown in Figure 2 of the drawings and a rim may be placed thereupon engaging the upper extremities of the legs and the tire then placed upon the rim and the rim ring subsequently applied. Or, in the removing of an old tire from a rim, the ring may be removed, the rim with the tire attached thereto placed upon the stand, when the tire may be readily forced from the rim.

Furthermore in the placing of a tire upon a rim which has loose rings thereupon, in which event ordinarily considerable difficulty is encountered in keeping one ring in place while the other is being applied, by using my improved stand it is obvious that one ring may be placed upon the rim and they together put upon the stand and the tire applied, when the second ring may be readily attached without any falling of the other ring, as is the case when like assembly is being accomplished on the floor.

In Figure 3 is shown a slightly modified form of stand where the body portion 8 is placed adjacent one end of the legs 9 which are otherwise similar in construction to the legs 2 shown in the other views, and in this event the body portion 8 may be rigidly attached to the floor of the garage or shop and have a central hole 10 therein through which a chain or other form of attachment may be made to engage a dead head or fixed eyebolt 11 and to the other end of the chain a hand spike 12 may be engaged for forcing a tire downwardly from a rim as indicated in dotted lines. In this event a pin indicated at 13 may be slipped through a link of the chain 14 to prevent the stand from tipping up in case of its not being otherwise fastened to the floor. In fact a hole 15 is shown in the preferred form of structure, Figures 1 and 2 through which a chain may be used in like manner to that just described in respect to Figure 3.

Upon the upper end and backside of each leg 2 is formed an inwardly projecting lug 16 for use in the assembling of a tire and split rim having loose rings thereupon so that the rim may rest upon these lugs and the ring upon the end of the legs when the assemblage is being accomplished.

Just below these lugs and in any convenient place on the back of each leg is formed a claw-like member 17 for cooperative engagement with a chain 18 which carries upon its upper end the rod 19 upon which is mounted the hook washer 20 made adjustable thereupon by the wing nut 21 screw threadedly mounted upon the rod, and by which adjustable attachment the tire rim when mounted upon the stand may be securely held down when desired; the hook of the washer 20 being placed over the upper edge of the rim and the nut 21 screwed down, the chain of course initially being caught in the claw 17 at approximately the right length for the desired adjustment.

Having thus described my invention, what I claim and desire to secure by Letters Patent, is:

1. A stand of the class described comprising a flat body portion, a plurality of upstanding body and rim supporting legs horizontally adjustably attached to the extremities of the body portion, and extending above and below same for the purpose described.

2. A tire rim stand of the type described comprising a body portion, a plurality of substantially T-shaped body and rim supporting members equally spaced and slidably mounted adjacent the marginal edge of said body portion, the head of said members forming legs extending above and below the body portion, and means upon the upper ends of said legs for the reception of a tire rim.

3. A stand of the type described comprising a body portion, a plurality of substantially T-shaped members equally spaced and slidably mounted adjacent the marginal edge of said body portion, the head of said members forming legs extending above and below the body portion, means upon the upper ends of the legs for the reception of a tire rim, and adjustable rim anchorage means carried adjacent each leg.

In testimony whereof I affix my signature

NEWTON R. INGLIS.